W. H. PUTNAM.
TRACTION AND ANTISKIDDING DEVICE.
APPLICATION FILED OCT. 3, 1912.
1,150,148.
Patented Aug. 17, 1915.
3 SHEETS—SHEET 1.
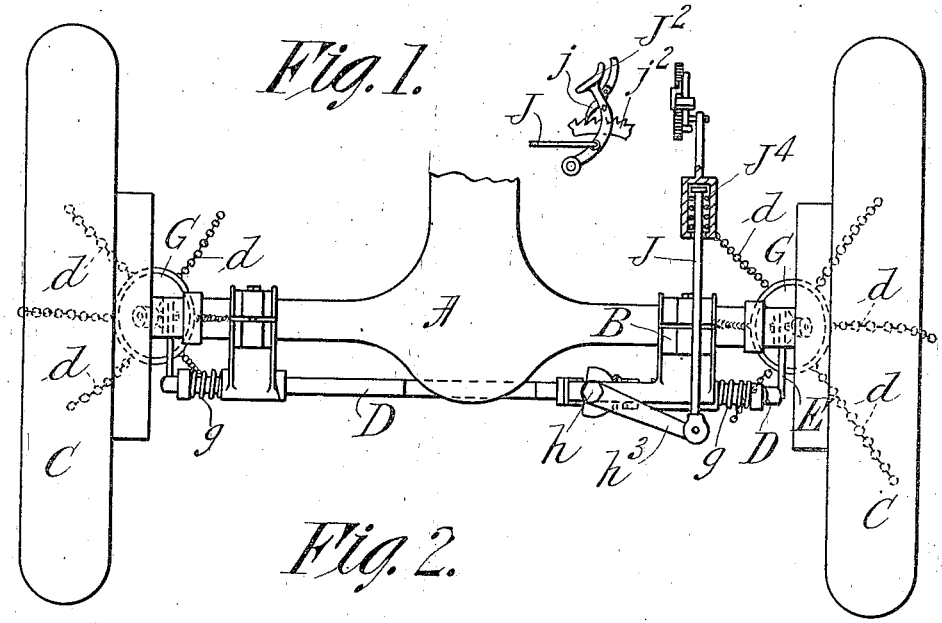
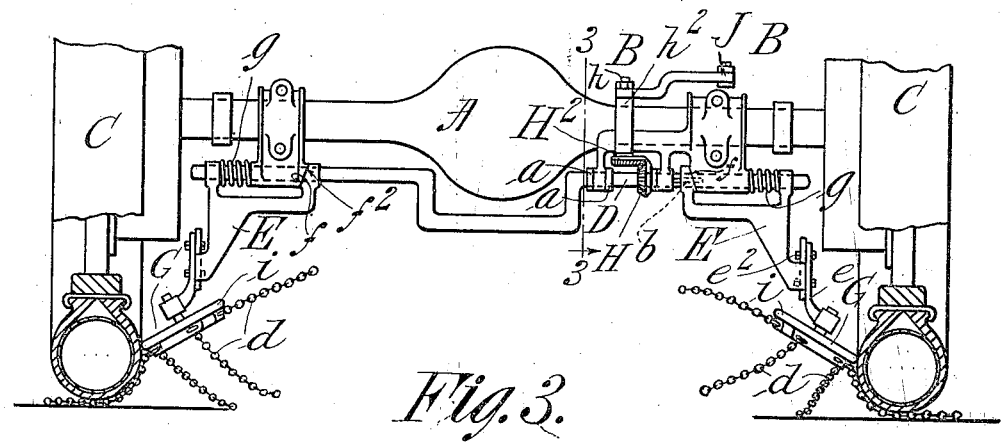
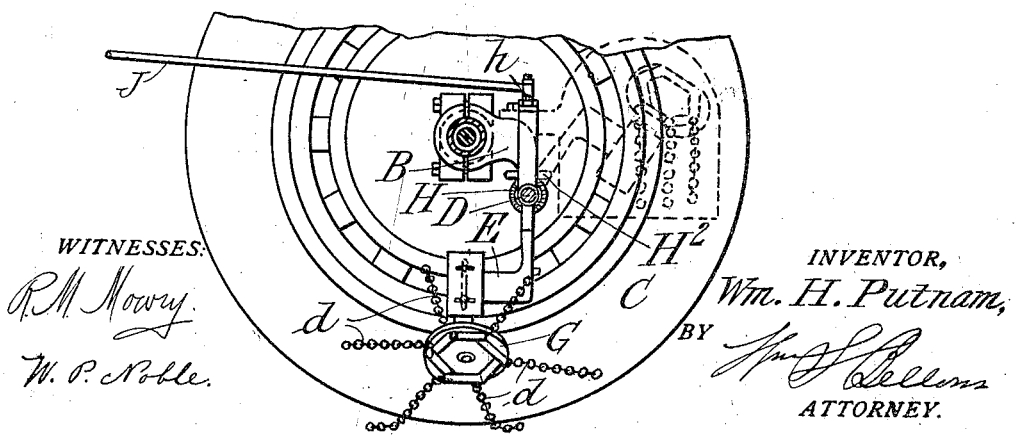
WITNESSES:
R. M. Mowry
W. P. Noble
INVENTOR,
Wm. H. Putnam,
BY
ATTORNEY.

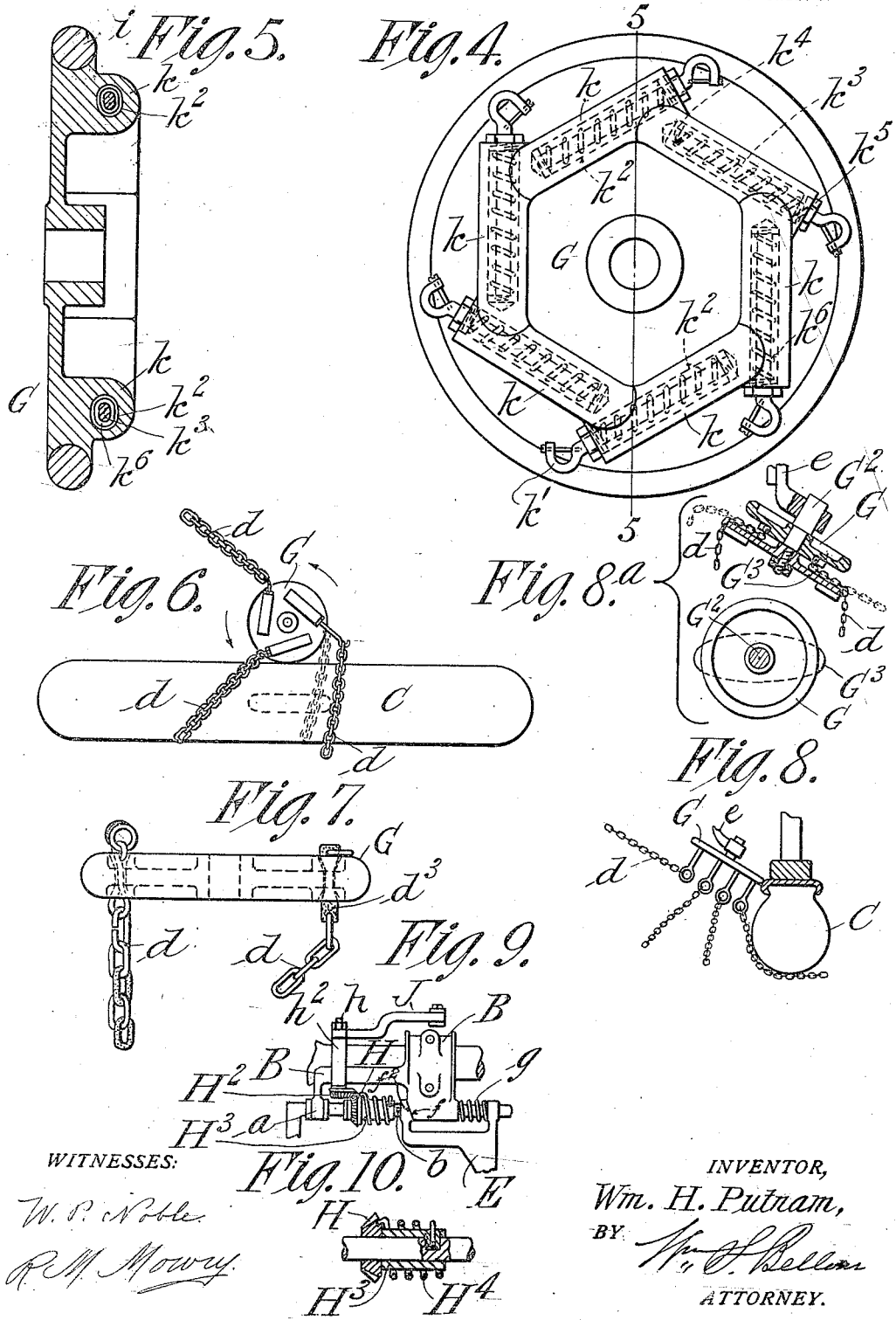

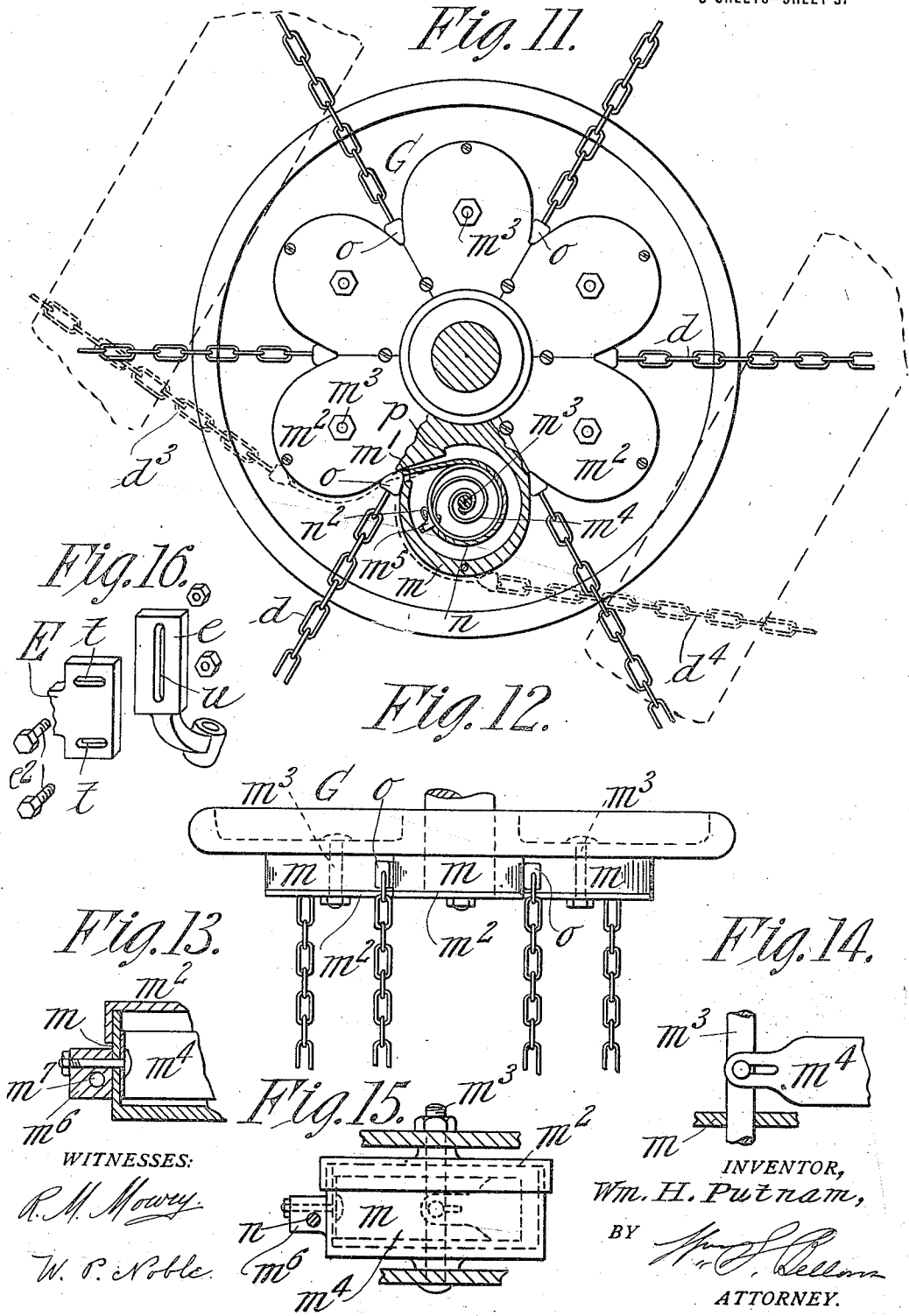

UNITED STATES PATENT OFFICE.

WILLIAM H. PUTNAM, OF NEW YORK, N. Y.

TRACTION AND ANTISKIDDING DEVICE.

1,150,148.  Specification of Letters Patent.  Patented Aug. 17, 1915.

Application filed October 3, 1912. Serial No. 723,673.

*To all whom it may concern:*

Be it known that I, WILLIAM H. PUTNAM, a citizen of the United States of America, and resident of New York, in the county of New York and State of New York, have invented certain new and useful Improvements in Traction and Antiskidding Devices, of which the following is a full, clear, and exact description.

This invention relates to a device for the prevention of the skidding, sliding or slipping of the wheels of automobiles or power vehicles and for increasing the tractional effect, the same being characterized by a roller or revoluble body mounted adjacent a portion of the vehicle wheel which is near the ground, the same being adapted to have frictional engagement with the wheel and being provided with a plurality of flexible members which are adapted under centrifugal force to be thrown radially so as to engage under the tread of the wheel, for an increase of the traction and for preventing skidding.

An object is to provide means in or appurtenant to the flexible members whereby they are elastic or endwise distensible and contractible so that in action there will be an avoidance of destructive effect both on such members and on the tread of the tire engaging therewith. And inasmuch as it is most advantageous that the device shall have the capability of being placed in cooperative relation with the wheel of the vehicle and withdrawn from such position when conditions for its use do not prevail, another object is to provide an efficient means for controlling the position of the flexible member-provided roller. And other objects are to provide constructions and arrangements of parts for further advantages as will be hereinafter rendered apparent.

The invention is described in conjunction with the accompanying drawings in which:—

Figure 1 is a plan view showing the rear portion of the running gear of an automobile equipped with my device and its controlling appliances. Fig. 2 is a rear elevation of the same; Fig. 3 is a cross sectional view, enlarged, on line 3—3, Fig. 2. Fig. 4 is a face view showing the construction of the body of the roller to which the flexible centrifugally acting members are to be attached, Fig. 5 being a sectional view of such body on line 5—5. Fig. 6 is a plan diagram showing the relations and action of the flexible members relatively to the wheel tread. Figs. 7 and 8 are views showing modifications. Fig. $8^a$ shows a chain deflector for the device. Figs. 9 and 10 are views in detail to be hereinafter referred to. Figs. 11, 12, 13, 14 and 15 are also views showing different details of construction of the roller and its retrieving or retracting means for the resiliently connected flexible members. Fig. 16 is a perspective view showing a detail of construction hereinafter referred to.

In the drawings, A represents the housing for the axle of the rear wheels C C and the differential gearing of the automobile, having a bracket B fixed thereon and rearwardly and downwardly projecting, the same supporting a rockshaft D which is arranged horizontally and parallel with the rear wheel axle. This rockshaft is held against endwise motion by the collars $a$ $a$.

E represents a bracket, the upper forward portion of which is of yoke shape to form by the separated members thereof an engagement about the rockshaft D, the same being slidable slightly endwise on the rockshaft, but by the provision of the sliding key or spline indicated at $b$, prevented from having any rotative motion independently of the rockshaft.

In other words when the shaft is turned the bracket E is swung and with it is bodily swung the roller G which carries the flexible members $d$ $d$.

The roller is preferably carried in an oblique position by being journaled in an arm $e$ which is adjustably held by the bolts $e^2$ on the bracket E.

The fixed bracket B is made with a cam face $f$ and one member of the yoke shaped bracket E is made with a cam face $f^2$ to match with the one $f$; and the spiral spring $g$ is applied for keeping the roller carrying bracket E forced as far outward as possible and as shown in Fig. 2, so that when the roller G is in position for its frictional engagement with the tire or other portion of the vehicle wheel C, the cam faces $f$, $f^2$ will be in matching relations for a detent action for the maintenance of such operative relations of the parts.

The rockshaft D has a bevel gear wheel H fixed thereon which meshes with a bevel gear wheel or sector $H^2$ carried on a vertical stud shaft $h$ vertically journaled in the hub-like member $h^2$ of the fixed bracket B, and provided with a lever or crank arm $h^3$ to which an operating rod J is connected, said rod extending to a forward portion of the machine, such, for instance, as to a position near the chauffeur's seat and adapted to be controlled by the usual foot lever $J^2$ having a detent pawl $j$ to engage in the ratcheted member $j^2$. The operating rod J may be made yielding and resilient with a spring coupling as shown at $J^4$ in Fig. 1. Any other manifest form of operating connection between the location near the chauffeur's seat and the lever arm $h^3$, and means for securing the connection in a given set position may be substituted for that herein particularly shown.

The roller G is to be edgewise of such character as to assure a proper frictional engagement with any suitable part of the vehicle wheel near the portion thereof which runs on the ground,—whether on a pneumatic or other tire as shown in Figs. 2 and 3, or upon a portion of the rim as shown in Fig. 8; and to this end the roller is advantageously provided with a rim, band or gasket $i$ of rubber, leather or the like or any material adapted to the purpose.

The roller carrying yoke E being capable of a movement axially relatively to the length of the rockshaft with and against the stress of the spring $g$ provides for compensation of any inequalities in the surface of the tire, allowing the play of the yoke in and out on the shaft to be free according to whether the roller rides over a depression in, or a protuberance on, the tire.

The arrangement and manner of support of the roller carrying yoke is such that such parts may swing back and ride over any obstacle which may be encountered without injury to the device.

In Figs. 9 and 10 as a matter of minor detail is illustrated a flexible mounting of the bevel gear wheel H on the rockshaft. This gear wheel instead of being keyed on the shaft,—as it might be,—is loosely fitted on the shaft, being suitably restrained against endwise movement; and next to the back of this gear a sleeve $H^3$ is provided, the same having a transverse perforation therethrough which is also continued into the shaft; and a spiral spring $H^4$ surrounding the sleeve has one end thereof anchored to the gear wheel and its other end anchored to the sleeve and shaft by extending through the aligned perforations in both the latter named parts. The above construction provides that in case an obstruction is encountered by the flexible member provided roller or the roller from any cause should be suddenly temporarily swung in a rearward direction, the shock instead of being imparted to the gearing and operating connections therefor will be absorbed in the spring $H^4$ which on such occasion would become more tightly wound.

The flexible members revolubly carried by the roller which derives rotative movement by its frictional engagement with the vehicle wheel,—which are centrifugally thrown so as to successively engage under the tread of the wheel are, either in the formation of the flexible members themselves or by attachments by which they are connected to the roller, of resilient character for longitudinal distention and contraction.

The object of this capability will be here explained: The positioning successively of the flexible members under the wheel tread and the engagements of the wheel tread therewith is effective under various conditions to impart a drawing force on the flexible members so that there would be a movement relatively between them and the tread of the tire, destructive alike to the tire and to the flexible members; and, therefore, by making such members resilient the above stated deteriorating action is prevented. In the carrying out of this object, as represented in Fig. 7, alternated ones of the links of the chain composing each flexible member $d$ are indicated as of elastic rubber, the relatively intermediate links being understood as of ordinary iron, steel or other metal, and as shown at the right of Fig. 7, the member $d^3$ is of rubber connecting a metallic chain to the roller.

In Figs. 4, 5 and 6 the body of the roller G is made with a plurality of bosses $k$ $k$ axially more or less tangentially arranged and having bores $k^2$ drilled therein in each of which a plunger rod $k^3$ having a piston-like member $k^4$ is provided, the outer end portion of such plunger rod being guided through an annular plug $k^5$ screw engaged in the mouth portion of the bore.

Each plunger rod has an eye member $k^1$ to which chain or other form of flexible member $d$ has its connection, and the spiral spring $k^6$ between the annular screw plug and the inner end wall of the bore imparts the retractile action to the plunger rod and chain therewith connected.

Equivalent or somewhat superior appliances for resiliently connecting the chains to the roller G are represented in Sheet No. 3 of the drawings in which the body of the roller is provided with a plurality of cup-shaped cases $m$, each closed by its individual detachable cap $m^2$, and each having an opening $m^1$ at one of its sides which is at about right angles to a line drawn radially from the center of the roller G through the center of the spring case; and a fixed post $m^3$ extends centrally through each spring case receiving connection therewith of the inner convolution of a clockspring $m^4$ to the outer end of which is secured a block $m^5$ having a boss $m^6$ formed with a transverse perforation $m^7$ therethrough, through which perforation a comparatively short cord or band $n$ is passed, the engagement of the cord with the parts being made by any suitable stop $n^2$ formed on or attached to the end of the cord. The cord or cable partially encircling the outer convolution of the clockspring thence extends through the aforementioned side opening $m^1$ and has a ball provided link $o$ attached thereto, such ball link forming the inner terminal of the chain $d$.

At a certain internal part of the spring case a shoulder $p$ is formed against which, when the chain is drawn out to its predetermined maximum, the lug $m^6$ will be brought to a limiting abutment. In this arrangement of the device each one of the chains under centrifugal action may be thrown angular to a radial line drawn from the center of the roller through the spring case opening $m^1$, either as indicated by the dotted lines $d^3$ in Fig. 11 or as indicated by the dotted lines $d^4$ in said figure, according as to whether the vehicle wheel diametrically shown in said Fig. 11 is running forwardly or is reversely rolling under a backing of the vehicle.

The device described in its singularity and for its coöperative action in relation to the wheel at one side of the vehicle is, as apparent from the drawings and as manifestly desirable, duplicated for the opposite wheel, the single rock shaft serving as the rocking support for, and for imparting the oscillatory movements to, both of the roller carriers.

As represented in Figs. 2 and 16, each roller G is susceptible of adjustments so that it may be more or less elevated and also so that it may be positioned more or less forwardly or rearwardly on its carrier E; and, as particularly shown in Fig. 16, the lower portion of the roller-carrying bracket E has a plurality of horizontal slots $t$ $t$, while the other member $e$ has a vertical slot $u$, the bolts $e^2$ having their confining engagements through the slots at their intersections so that, therefore, the member $e$ is adjustably movable on two lines which are at right angles to each other.

There may be on the housing for the rear axle and differential gearing a downwardly opening incasement into which the portion of the anti-skid device comprising the roller and its flexible members may be housed when swung to its elevated and non-operative position; and when the device has such position, the cam inclined faces $f$, $f^2$ are effective to impart a sufficient degree of bodily movement to the roller device whereby it is carried inwardly clear of the vehicle wheel.

When the device is to be put into operation, the gear H is given a partial rotation through operating connections therewith and the roller carriers are swung downwardly so that the device is brought to coaction with the wheel, the cam surfaces on coming to matching relations or facewise engagements permitting the outward movement of the carriers E,—the springs $g$ imparting such movement thereto.

Inasmuch as the chain sections $b$ which are of very inexpensive character may require frequent replacement, it is to be perceived from the drawings that means for the detachable connections of the chains on the roller are provided: In Fig. 4 the eye formed ends of the plunger rod are constructed to this end; and in Fig. 7, the body of the roller is made with a plurality of transverse perforations through which the extremities of the chains are passed and retained by split rings; and, as manifest from the drawings, in which various modifications in the detail construction of the roller are shown, the invention is not incapable of considerable structural variability.

The shaft $G^2$ on which the roller G rotates is, itself, non-rotatively carried by the arm at the lower end of the bracket or roller-carrier; and immovably supported on the lower portion of such shaft, slightly below the roller, is a deflector plate $G^3$ extending oppositely beyond the circumference of the roller and serving to assist in imparting a radial disposition of the chains which pass over the deflector, especially at times when the vehicle is running at quite low speed, and before any considerable degree of centrifugal force may be developed.

I claim:—

1. In a device of the character described, the combination with a vehicle wheel, of a rockshaft mounted on the vehicle having a carrier on which a roller is rotatively mounted and adapted for frictional engagement with the wheel, and to be revolved thereby, and provided with a plurality of flexible members to successively engage under the tread of the wheel, and means for imparting rocking movement to said shaft for placing said roller into and out of its engagement with the wheel.

2. In a device of the character described, the combination with a vehicle wheel, of a rockshaft mounted on the vehicle having a carrier on which a roller is rotatively mounted and adapted for frictional engagement with the wheel, and to be revolved thereby, and provided with a plurality of flexible members to successively engage under the tread of the wheel, and an operating connection for the rock shaft including resiliently connected members.

3. In a device of the character described, the combination with a vehicle wheel, of a rockshaft mounted on the vehicle having a carrier on which a roller is rotatively mounted and adapted for frictional engagement with the wheel, and to be revolved thereby, and provided with a plurality of flexible members to successively engage under the tread of the wheel, said rock shaft being provided with a gear wheel, another gear in mesh with the first one and having unitary therewith a lever arm, and means connected with said arm, and extending to adjacent the seat of the vehicle for imparting a swinging movement to said arm.

4. In a device of the character described, the combination with a vehicle and its wheel, of a shaft support on the vehicle and a rockshaft, mounted in said support, having a carrier on which a roller is rotatively mounted and adapted for frictional engagement with the wheel, and to be revolved thereby, and provided with a plurality of flexible members to successively engage under the tread of the wheel, said rock shaft being provide with a gear wheel, and said roller carrier being endwise movable but non-rotative relatively to the shaft,—such carrier and said rock shaft support having coacting engagement faces, and a spring for forcing the roller carrier endwise relatively to the shaft, another gear in mesh with the first one and having unitary therewith a lever arm, and means connected with said arm for imparting a swinging movement thereto.

5. In a device of the character described, the combination with a vehicle and its wheel, of a rock-shaft support on the vehicle and a rock shaft mounted therein, having a carrier on which a roller is rotatively mounted and adapted for a frictional engagement with the wheel and provided with a plurality of flexible members, means for imparting rocking motion to said shaft whereby the roller will be brought to either its coacting or non-operative relation to the vehicle wheel, and detent means for restraining the roller in its operative coaction with the wheel.

6. In a device of the character described, the combination with a vehicle and its wheel, of a carrier having a rocking support and provided with a roller rotatively mounted therein and adapted for a frictional engagement in the vehicle wheel and provided with a plurality of flexible members, means for imparting rocking motion to said support whereby the roller will be brought to a lowered position adjacent the ground bearing portion of the wheel, and means for imparting, during the rocking movements of said carrier, bodily movements of the carrier toward and away from the plane of revolution of the wheel.

7. In a device of the character described, the combination with a vehicle and its wheel, of a rockshaft support on the vehicle and a rockshaft mounted therein, having a carrier on which a roller is rotatively mounted and adapted for a frictional engagement with the wheel and provided with a plurality of flexible members, said carrier being engaged with said rockshaft whereby it oscillates in unison therewith, and means for imparting on the rocking movements of said shaft movements of said carrier on line with the shaft axis.

8. In a device of the character described, the combination with a vehicle and its wheel, of a shaft support on the vehicle and a rockshaft mounted in said support having a carrier on which a roller is rotatively mounted and provided with a plurality of flexible members, said rockshaft being provided with a gear wheel yieldingly engaged thereon, another gear in mesh with the first named gear, and means for imparting rotative movement thereto.

9. In a device of the character described, the combination with a vehicle and its wheel, of a roller-carrier mounted for a rocking movement on the vehicle and composed of members which are adjustable the one vertically relatively to the other and a roller rotatively mounted on the adjustable member and having a plurality of flexible members adapted, under centrifugal force, to acquire dispositions more or less nearly radially of the roller.

10. In a device of the character described, the combination with a vehicle and its wheel, of a roller-carrier mounted for a rocking movement on the vehicle and composed of members which are adjustable the one transversely relatively to the other and a roller rotatively mounted on the adjustable member and having a plurality of flexible members, adapted, under centrifugal force, to acquire dispositions more or less nearly radially of the roller.

11. In a device of the character described, the combination with a vehicle and its wheel, of a roller-carrier mounted for a rocking movement on the vehicle and composed of members which are adjustable transversely and vertically relatively to each other, and a roller rotatively mounted on the adjustable member and having a plurality of flexible members, adapted, under centrifugal force, to acquire dispositions more or less nearly radially of the roller.

12. In a device of the character described, the combination with a vehicle wheel, of a roller mounted adjacent the ground bearing portion of the wheel, adapted to have frictional engagement with the latter and provided with a plurality of flexible members adapted, under centrifugal force, to be thrown for engagement under the wheel tread, and resilient or elastic means to permit the flexible members to be endwise distensible and contractible.

13. In an anti-skid device of the character described, a roller having a plurality of spring cases mounted thereon, springs in said cases, and flexible members connected with said springs, adapted to be yieldingly outwardly drawn relatively to the roller and to be retracted by said springs.

14. In an anti-skid device of the character described, a roller having a plurality of spring cases on the body thereof, each having a fixed central post and an opening through its side, a clockspring in each case having a terminal of one of its convolutions affixed to said post and having a cord connected to the terminal of its outer convolution, which cord extends through said sidewise opening in the case, and a flexible member connected to each said cord.

15. In an anti-skid device of the character described, a roller having a plurality of spring cases on the body thereof, each having a fixed central post and an opening through its side, a clockspring in each case, having its inner end affixed to said post and having a cord connected to its outer end, which cord extends through said sidewise opening in the case, a flexible member connected to each said cord, and means for limiting the outward draft movement of each flexible member against the reaction of its spring.

16. In an anti-skid device of the character described, a roller having a plurality of spring cases on the body thereof, each having a fixed central post, an opening through its side, and a shoulder on its side wall, a clockspring in each case having its inner end affixed to said post and having a boss, an outwardly projecting boss-provided member connected to its outer end, a cord secured to said member which extends through said sidewise opening in the case, a flexible member connected to each said cord, said boss serving, by abutment with said shoulder, as a stop for limiting the unwinding of the spring.

17. In a device of the character described, the combination with a vehicle and its wheel, of a shaft support on the vehicle and a rockshaft mounted in said support having a carrier on which a roller is rotatively mounted, provided with a plurality of flexible members, said rockshaft being provided with a gear wheel loose thereon, a spring having an engagement with said shaft and said gear for yieldingly connecting one with the other, another gear in mesh with the first named gear, and means for imparting rotative rotative movement to the latter gear.

18. In a device of the character described, the combination with a vehicle and its wheel, of a shaft support on the vehicle and a rockshaft mounted in said support having a carrier on which a roller is rotatively mounted, provided with a plurality of flexible members, said rockshaft being provided with a gear loose thereon, a sleeve on the shaft adjacent said gear, a coiled spring encircling said sleeve having an engagement with the latter, with the shaft and also with said gear, another gear in mesh with the first named gear, and means for imparting rotative movement to the latter gear.

19. In an anti-skid device of the character described, a roller having a plurality of flexible members to acquire under centrifugal force more or less nearly radial dispositions, said flexible members comprising each interengaged chain links,—one or more of such links being elastic.

20. In a device of the character described, the combination with a vehicle and its wheel, of a roller mounted adjacent the ground bearing portion of the wheel, adapted to have frictional engagement with the latter, and provided with a plurality of flexible members adapted, under centrifugal force, to be thrown for engagement under the wheel tread, and means adjacent the roller for mechanically imparting an outward disposition to the portions of the flexible members near such roller.

21. In a device of the character described, the combination with a vehicle and its wheel, of a roller support having a downwardly extending shaft fixed thereon, of a roller rotatively mounted near the lower portion of said shaft and adjacent and for coaction with the ground bearing portion of the wheel, provided with a plurality of flexible members, and a deflector for imparting an outward disposition to the portions of the flexible members near such roller, supported by the lower portion of said shaft slightly below the roller.

Signed by me at N. Y. city, N. Y., in presence of the subscribing witnesses.

WILLIAM H. PUTNAM.

Witnesses:
A. E. PETERSON,
E. C. COLE,
WALTER R. KYTE.